United States Patent [19]

Pollet et al.

[11] Patent Number: 5,026,410
[45] Date of Patent: Jun. 25, 1991

[54] PROCESS FOR IMPREGNATING FILAMENT STRANDS

[75] Inventors: Jean-Claude Pollet, Granville; Gary L. Williams; Gordon P. Armstrong, both of Newark; Martin C. Flautt, Granville, all of Ohio

[73] Assignee: Owens-Corning Fiberglas Corporation, Toledo, Ohio

[21] Appl. No.: 269,089

[22] Filed: Nov. 9, 1988

Related U.S. Application Data

[63] Continuation of Ser. No. 24,953, Mar. 12, 1987, abandoned.

[51] Int. Cl.$^5$ .................. B05D 3/02; C03C 25/02; D02G 3/00
[52] U.S. Cl. .................. 65/3.43; 65/3.41; 427/389.8; 428/372; 428/378; 428/389; 428/391; 428/392
[58] Field of Search .................. 65/3.41, 3.43; 427/389.8; 428/372, 378, 389, 391, 392

[56] References Cited

U.S. PATENT DOCUMENTS

| | | | |
|---|---|---|---|
| 2,723,208 | 11/1955 | Morrison | 427/389.8 X |
| 3,418,094 | 12/1968 | Marsden et al. | 65/3.41 |
| 3,450,658 | 6/1969 | Morison | 427/389.8 X |
| 3,717,448 | 2/1973 | Drummond et al. | 65/3.43 |
| 3,773,546 | 11/1973 | Marzocchi | 524/538 X |
| 3,862,287 | 1/1975 | Davis | 427/375 X |
| 3,918,947 | 11/1975 | Maaghul et al. | 65/3.43 |
| 4,225,650 | 9/1980 | van Brederode et al. | 525/387 X |
| 4,614,678 | 9/1986 | Ganga | 428/367 X |

Primary Examiner—Lorraine T. Kendell
Attorney, Agent, or Firm—Patrick P. Pacella; Catherine B. Martineau

[57] ABSTRACT

A method for impregnating a strand of filaments during the strand manufacture with thermoplastic or thermoset polymer powder particles is disclosed. The method includes the steps of forming a strand of filaments, keeping the filaments separate, impregnating the filaments with an aqueous slurry containing the powder particles, and drying the filaments to remove the water and produce a strand impregnated with powder particles. The powder particles are present on the strand in an amount of between about 5 to 50 weight percent based on the weight of the impregnated strand. Glass fibers coated with the slurry according to the process of this invention are suitable for impregnation with thermoplastic powders.

5 Claims, No Drawings

PROCESS FOR IMPREGNATING FILAMENT STRANDS

This is a continuation of application Ser. No. 024,953, filed Mar. 12, 1987, now abandoned.

TECHNICAL FIELD

This invention relates to a process for producing a highly loaded, impregnated fibrous strand where the impregnation takes place during the fiber forming operation. In one of its more specific aspects, this invention relates to a process for producing thermoplastic or thermoset powder impregnated glass fiber strands.

BACKGROUND OF THE INVENTION

The idea of fiber impregnation by powdered resin is well-known. Over the years, the industry has used different techniques for producing yarns or rovings (prepregs) impregnated with various thermoplastic or thermoset polymer powders. One known process passes bundles of filaments (glass, carbon or even Aramid ® fibers) through a fluidized bed of powdered thermoplastic resin. The filaments are kept separate by different means so that the resin can be picked-up by the filaments.

Another process achieves adherence of the polymer powder to the yarn or roving by creating an electrostatic charge on either the yarn or the powder. Another process to adhere the powder to the yarn is by mechanical means. Short-toothed combs, stationary or rotating rods or bars and the like separate the yarns so that the powders may penetrate the filaments. Still other processes sheath the rovings with a flexible polymer sleeve after the powder has penetrated the fibers in an attempt to keep the powder on the fibers before the fibers are used in a molding process. Another alternative process fuses the powder impregnated strands into a rigid ribbon in order to keep the powder on the strands.

Still another process produces fiber reinforced thermoplastic material directly from the bushing by extruding filaments into a bed of dry thermoplastic powder which has a lower melting point than the filaments. The powder sticks to the filaments so that impregnation takes place when the filaments are still separate. These filaments must be cut into granules or fed directly to a heated die.

All of these processes are based on the same principle of dry impregnation of a strand followed by some type of post treatment. Each process has its problems. For example, plain impregnated strands with no sizing or further treatment usually lose much of the impregnated powder before molding, while the flexible sleeve typically creates resin rich, glass poor areas in the molded part and the rigid ribbons are difficult to process.

Further, problems occur when the thermoplastic or thermoset resin powder is put between the filament bundles after the filaments have previously been gathered or glued together into a bundle. The filaments in the bundles must be separated or "unglued" and often good "wet out" or dispersion of the resin between the filaments is not achieved. Rather, the resin forms a sheath or coating around the bundle and in the final injection molded products, these glass bundles remain intact and good glass dispersion is not achieved.

Considerable time and expense would be saved if a method for impregnating strands with a thermoplastic or thermoset resin could be employed which would eliminate non-aqueous solvents, fluidized beds, sheaths, and time-consuming extrusion techniques or other, dangerous methods for applying thermoplastic or thermoset resins to fibers. This invention is directed to that objective.

SUMMARY OF THE INVENTION

The present invention is directed to a process for producing a highly loaded, impregnated fibrous strand where the impregnation of the strand takes place during the fiber forming process. This is accomplished by using a powdered polymer resin slurry to impregnate the strand prior to gathering the fibers together into the strand. The impregnated strand can be subsequently dried to remove the water, and cured or set to attach the powder particles along the surfaces of the fibers. Heating of the impregnated strand allows for the fusing (gluing) of the melted powders to the fibers. The present process may employ doctor-blade modified conventional roll applicator or positive feed, slot applicator to carry out the invention.

DETAILED DESCRIPTION OF THE INVENTION

The present invention relates to an improved process for the production of a yarn or strand (bundle of filaments) pre-impregnated with a thermoplastic or thermoset polymer during the filament forming operation. The process of the present invention can be practiced using conventional roll application methods or a positive feed, slot applicator. Glass, carbon, aramid polyester or polyethylene filaments, as well as other known fibers or hybrid combinations of these fibers, are suitable fibers which can be impregnated according to the process of the present invention.

Generally, the process involves the formulation of a size composition which contains a carrier solvent, normally water, a coupling agent, a binder or film former material, and a thickener or rheology modifier material. A matrix thermoplastic or thermoset resin powder is dispersed in the sizing to form a slurry.

Any suitable coupling agent can be employed in the successful practice of this invention. The coupling agent acts to produce adhesion between the matrix resin and provide strength development and retention of the matrix resin in the slurry. One example of a suitable coupling agent is a silane. Preferably, the silane is an organosilane including, for example, gammaaminopropyltriethoxysilane (commercially available from Union Carbide under the trade name "A-1100"). The coupling agent will be contained in an amount within the range of from about 0.05 to about 5 percent, by weight, of the slurry mixture.

Any suitable binder material can be employed. The binder or film former material aids in the handling and processing of the filament during the process of the present invention. Suitable binder or film former materials are, for example, epoxy, polyester, polyvinyl acetate, polyvinyl alcohol, acrylics, or other chemicals which have the ability to bond the thermoplastic or thermoset powder particles to the fiber upon the evaporation of the water or which have the ability themselves to suspend the particles in the slurry and subsequently bond themselves to the fiber. The binder material will be contained in an amount within the range of from about 0.5 to about 5 percent, by weight, of the slurry mixture.

Any suitable thickener material can be employed. The thickener material acts as a rheology modifier so that the thermoplastic or thermoset powder particles will transfer to the fiber. Without the thickener material the powder particles may stay behind on the rolls of the applicator while the carrier solvent goes on the fiber. The result would be a rapid build-up of powder on the applicator rolls, which in turn, rapidly causes fiber breakage.

The process of the present invention is useful for the impregnation of any thermoplastic or thermoset resins which can be produced or reduced into a powder such as, for example, polyvinyl chloride, PVC, CPVC, polyethylene, polypropylene, nylon, poly(butylene terephthalate) PBT, or poly(ethylene terephthalate) PET, polyester, or solid epoxies. Also, high performance materials such as liquid crystal polymers, polyetheretherketone (PEEK) or poly phenylene sulfide (PPS) can be used.

The thermoplastic or thermoset resins are dispersed into the sizing in the form of fine particles. In a preferred embodiment the size of the powder particles are between about 5 to 50 microns, or more preferably between about 10–30 microns. According to the process of the present invention the resin powders can be applied to the filaments in an amount within the range of between about 5 to about 50 percent, by weight, of the final prepreg yarn or strand.

According to the process of the present invention the sizing mixture suspends the thermoplastic or thermoset powder particles in the slurry. The resultant slurry is sufficiently liquid to be applied to the fibers during the fiber-forming operation. Each fiber is coated by the slurry mixture as the fibers are formed, that is, at or about the place in their formation where the conventional size compositions are typically applied (e.g., between the bushing and the spindle on which the fibers are wound as a package). In one embodiment, the continuous fibers leave the bushing and are dipped into the slurry mixture and are impregnated with the slurry mixture. The highly loaded thermoplastic or thermoset fibers are subsequently dried in order to evaporate or remove the water. The impregnated strands are then cured in order to set the binder or film former material. The curing or setting "glues" the powder particles along the surface of the fibers.

When thermoplastic powders are used, the resultant impregnated strands can be subsequently heated to allow the melted thermoplastic polymers to fuse. Thermoset powders, which are solids at room temperature, normally do not need a heatsetting step.

It is also within the contemplated scope of the process of this invention that organic or inorganic particulates, such as metallic fillers useful in producing conductive rovings, may also be used with the thermoplastic or thermoset polymer powder particles. These fillers can either be pre-combined with the polymer so that each powder particle contains polymer and filler or be added separately as a powder to the slurry.

The resultant impregnated strands can be chopped, either before or after drying, to be used for such operations as injection molding. Continuous thermoplastic or thermoset impregnated strands can be filament wound or pultruded to achieve thermoplastic or thermoset fiber reinforced end use items.

While the above describes the present invention with sufficient particularity, the following is intended to further exemplify the present invention. The following thermoplastic slurry was applied to glass fibers during the forming operation to achieve a thermoplastic content of 23% relative to the total weight of the prepreg strand.

| Composition and Range | | Example | |
|---|---|---|---|
| Polyamide powder | 30 to 50% | Orgasol 1002D | 40% |
| Polyoxyethylene | .5 to 5% | Polyox WSR 205 | 1.2% |
| Coupling Agent | .05 to 5% | A1100 | .2% |
| Water | balance to 100% | Water | 58–6% |

The polyamide thermoplastic powder has preferably an average particle size between 5 and 40 micrometers and no particle retained by an 80-mesh screen (more preferably 115 mesh, most preferably 200 mesh). Orgasol 1002D is a nylon 6 powder available from ATOCHEM (France). Polyox WSR 205 is a tradename for polyethylene oxides available from Union Carbide; other polyethylene oxides of different molecular weight, molecular weight distribution or branching may also be suitable, such as any of the Polyox series having a molecular weight between 100,000 and 4,000,000. A1100 is gammaaminopropytriethoxysilane available from Union Carbide.

Once the slurry was mixed together, continuous glass fibers were coated with the slurry mixture. The impregnated glass fibers were then collected into a strand, and the strand was then wound around a take-up bobbin to form a substantially cylindrical package (conventionally termed a "yarn package"). The yarn package was dried so as to evaporate the water from the impregnated strands and then cured or set so as to allow the binder material to "glue" the thermoplastic powder particles along the surfaces of the glass fibers.

Composites molded from the prepreg strands made by using the example formulation exhibit properties superior to those of competitive products.

It will be evident from the foregoing that various modifications can be made to this invention. Such, however, are considered as being within the scope of the invention.

We claim:

1. A method for impregnating a strand of glass fiber filaments with thermoplastic reinforcing resin during a fiber forming process to form a thermoplastic reinforcing resin impregnated strand comprising the steps of:
   forming a plurality of glass fiber filaments;
   keeping the filaments separate;
   impregnating the filaments with an aqueous slurry comprising water; from 30–50%, by weight, thermoplastic reinforcing resin powder, from 0.05–5.0% by weight, organosilane coupling agent; and, from 0.5–5.0% by weight, film former;
   collecting the impregnated filaments into a strand;
   drying the strand to remove the water and produce the strand impregnated with the thermoplastic reinforcing resin powder; and,
   curing the impregnated strand during the drying step in order to bond the thermoplastic reinforcing resin powder to the filaments.

2. A method according to claim 1 wherein the slurry contains metallic powder particulates.

3. A method according to claim 1 wherein the thermoplastic powder is a polyamide powder.

4. A method according to claim 1 wherein the aqueous slurry further contains rheology modifiers.

5. A method according to claim 4 wherein the slurry further contains polyethylene oxide as the film former.

* * * * *